United States Patent [19]
Imakura et al.

[11] Patent Number: 5,349,650
[45] Date of Patent: Sep. 20, 1994

[54] ADDRESS TRANSLATING APPARATUS FOR TRANSLATING VIRTUAL ADDRESS INTO REAL ADDRESS WITHOUT DEPENDING ON PROCESSING BY CPU

[75] Inventors: Tatsuya Imakura; Mitsuru Sugita, both of Hyogo, Japan

[73] Assignee: Mitsubishi Denki Kabushiki Kaisha, Tokyo, Japan

[21] Appl. No.: 723,011

[22] Filed: Jun. 28, 1991

[30] Foreign Application Priority Data

Oct. 8, 1990 [JP] Japan .................. 2-271407

[51] Int. Cl.⁵ ............................................ G06F 12/08
[52] U.S. Cl. .................................. 395/400; 395/425; 364/244.9; 364/255.1; 364/258.1; 364/259.2; 364/DIG. 1
[58] Field of Search ........................ 395/400, 425

[56] References Cited

U.S. PATENT DOCUMENTS

| 4,829,420 | 5/1989 | Stahle | 395/200 |
| 5,146,607 | 9/1992 | Sood et al. | 395/800 |
| 5,175,536 | 12/1992 | Aschliman et al. | 340/825.04 |

FOREIGN PATENT DOCUMENTS

0115609 8/1984 European Pat. Off. .

Primary Examiner—Joseph L. Dixon
Assistant Examiner—Reginald Bragdon
Attorney, Agent, or Firm—Lowe, Price, LeBlanc & Becker

[57] ABSTRACT

An address translating circuit is disclosed for translating a virtual address signal generated from an external CPU into a real address signal applicable to the dual-port random access memory (DPRAM) in the microcomputer. This address translating circuit includes an offset register, an enabling signal generating circuit, and a subtractor provided in the microcomputer. The offset data obtained based upon the difference between an address map handled by the external CPU and an address map handled by the internal CPU is set in the offset register. The enabling signal generating circuit is responsive to the more significant bits of the virtual address signal and the offset data to generate an enabling signal. The subtractor is responsive to the intermediate bits of the virtual address signal and the offset data to generate a translated address signal. Since the address translation is performed by circuit operation without depending on the processing of the external CPU, the burden on the external CPU is reduced 12 Claims, 8 Drawing Sheets

ADDRESS TRANSLATING APPARATUS FOR TRANSLATING VIRTUAL ADDRESS INTO REAL ADDRESS WITHOUT DEPENDING ON PROCESSING BY CPU

BACKGROUND OF THE INVENTION

1. Field of the Invention

The present invention relates generally to address translating apparatuses, and particularly to an address translating apparatus which translates a virtual address signal into a real address signal for accessing a memory cell array. The present invention has particular applicability to an address translating circuit which is provided within a microcomputer.

2. Description of the Background Art

Currently, microcomputers are utilized in various fields, and they are often used in data processing or in automatic control of various equipments, for example. A microcomputer often comprises a memory cell array for storing data operated or to be operated therein, in addition to a central processing unit (hereinafter referred to as CPU). More specifically, in a microcomputer, data is written into a memory cell array and the written data is read out in accordance with instruction from CPU.

In addition, a case often arises in which it is desired to externally refer to the data stored in the memory cell array of a microcomputer. To satisfy the request in this case, i.e. the request for also externally accessing the memory cell array, a dual-port random access memory (hereinafter referred to as DPRAM) is provided an internal memory within a microcomputer.

Generally, a DPRAM has two input/output ports. Specifically, the DPRAM provided within a microcomputer is accessed through the one input/output port by an internal CPU, and it is accessed through the other input/output port by an external CPU. More particularly, the external CPU can read out the data, which has been written into the DPRAM through the one input/output port by the internal CPU, through the other input/output port. On the other hand, the external CPU can also write data into the DPRAM through the other input/output port.

Generally, in order that the external CPU may access the DPRAM of a microcomputer to (write therein/read therefrom), it is necessary to translate the address which the external CPU handles, i.e. a virtual address, into a real address signal (or a physical address signal) for designating a memory cell of the DPRAM. Now it is assumed that a virtual address means an address on a software basis, i.e. a memory map basis, which is handled by the external CPU.

Generally, the translation from a virtual address signal into a real address signal has so far been performed by operation processing by a CPU. This means that the burden of the CPU is increased by processing for address translation. More specifically, the arithmetic operations to be processed by the CPU are increased by the quantity of operations required for address translation, which delays the operational processing which is originally to be done by the CPU. In other words, the processing rate of the CPU has been lowered because of address translation.

As another method of performing address translation, it might be considered effective to provide a circuit for address translation within a microcomputer. In this method, however, the translatable address is fixed by the circuit, and necessity for circuitry change arises in order to adapt it to a plurality of external CPUs. It is not easy nor realistic to change the circuit configuration of such address translation circuits in accordance with the conditions in which address translation is needed.

SUMMARY OF THE INVENTION

One object of the present invention is to translate a virtual address signal into a real address signal without depending on operational processing by a CPU.

Another object of the present invention is to translate a virtual address signal generated from an external CPU into a real address signal in a microcomputer having a memory array accessible from an external CPU without depending on operational processing by a CPU.

Yet another object of the present invention is to translate a plurality of virtual address signals generated from an external CPU based upon different memory maps real address signals adaptable to the memory array microcomputer having a memory array accessible from an external CPU without depending on operational processing by a CPU.

Still another object of the present invention is to translate virtual address signals generated from a plurality of external CPUs having different memory into real address signals adaptable to the memory array in a microcomputer having a memory array accessible from external CPUs without depending on operational processing by a CPU.

The address translating apparatus according to the invention comprises an offset data holding circuit which holds predetermined offset data for address translation, an enabling circuit responsive to predetermined more significant bits of an externally applied virtual address signal and predetermined more significant bits of the offset data held within offset data holding circuit for enabling accessing the memory cell array, and a real address signal generating circuit responsive to predetermined less significant bits of the virtual address signal and predetermined less significant bits of the offset data held within offset data holding circuit for generating a real address signal.

In operation, all the elements constituting the address translation apparatus are implemented with circuits, so that the processing by the CPU needed for address translation is largely reduced. Therefore, it is possible to translate a virtual address signal into a real address signal without depending on operational processing by the CPU.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
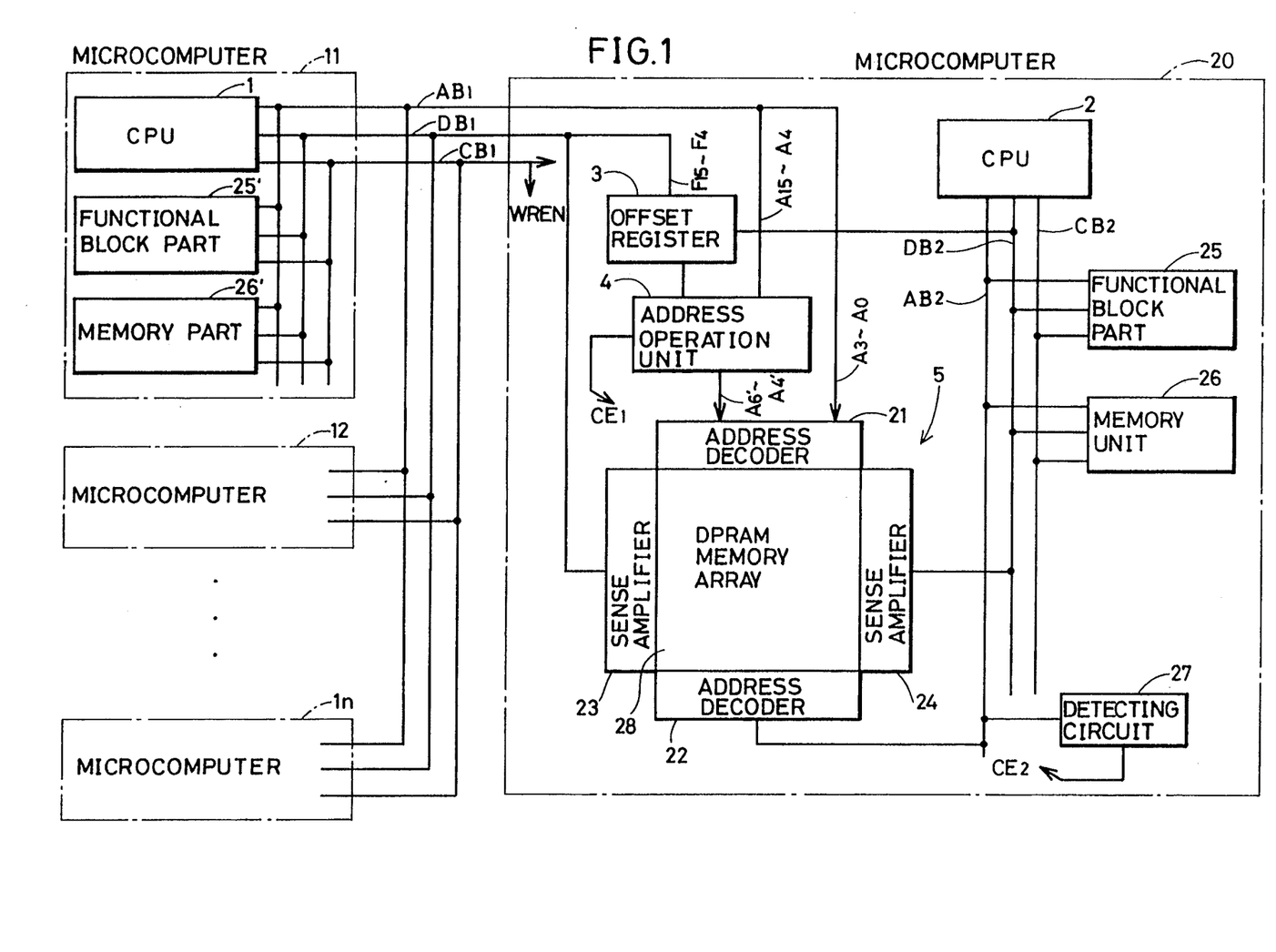
FIG. 1 is a block diagram of a microcomputer to which an embodiment of the invention is applied.

Referring to FIG. 1, a microcomputer 20 comprising a DPRAM 5 is connected through an address bus AB1, a data bus DB1, and a control bus CB1 to a microcomputer 11. The microcomputer 20 comprises a CPU 2 for executing data processing in the microcomputer 20, a functional block part 25, and a memory unit 26 for storing a program and data. The CPU 2, the functional block unit 25 and the memory unit 26 are connected through the address bus AB2, the data bus DB2 and the control bus CB2.

The DPRAM 5 has two input/output ports. Specifically, the DPRAM 5 comprises an address decoder 22 and a sense amplifier 24 as the first input/output port, and an address decoder 21 and a sense amplifier 23 as the second input/output port. The address decoder 22 is connected through the address bus AB2 to receive the internal address signal handled by the CPU 2. The address decoder 22 responds to the internal address signal and designates the memory cell to be accessed. The memory array 28 is connected through the sense amplifier 24 to the data bus DB2. The data signal to be written in the memory array 28 is given through the data bus DB2 and the sense amplifier 24 to the memory array 28. The data signal written in the memory array 28 is given to the data bus DB2 after being amplified by the sense amplifier 24.

The detecting circuit 27 connected to the address bus AB2 generates an enabling signal CE2 when an internal address signal within the predetermined range is given to the address bus AB2. Accessing the DPRAM 5 by the CPU 2 is enabled in response to the signal CE2. More specifically, the address decoder 22 and the sense amplifier 24 are enabled.

The microcomputer 20 further comprises a translating circuit which translates a virtual address signal generated from the microcomputer 11 into a real address signal (a physical address signal) for DPRAM 5. Thus, as a translating circuit, there are provided an offset register 3 holding the offset data for address translation and an address operation unit 4 performing address translation processing. The offset register 3 is connected through the external data bus DB1 to receive the offset data of 12 bits F15-F4 generated from the microcomputer 11. The address operation unit 4 is connected through the external address bus AB1 to receive the 12 bit virtual address signals of 12 bits A15-A4 generated from the microcomputer 11. The address decoder 21 is connected through the external address bus AB1 receive the 4 bit virtual address signals A3-A0 generated from the microcomputer 11.

The address operation unit 4 generates a signal CE1 for enabling the second input/output port of the DPRAM 5 and the translated address signals of 3 bits A6'-A4', in response to the 12-bit offset data held within the offset register 3 and the 12 bit virtual address signals A15-A4. The address decoder 21 and the sense amplifier 23 are responsive to the signal CE1 to be enabled. The address decoder 21 is responsive to the translated address signals A6'-A4' and the externally given address signals A3-A0 to designate memory cells in the memory array 28.

The microcomputer 11 also includes a CPU 1, a functional block unit 25', and a memory unit 26'. The CPU 1, the functional block unit 25' and the memory unit 26' are connected through the external address bus AB1. the external data bus DB1, and the external control bus CB1 to the microcomputer 20. In addition to this, the other microcomputers 12 and 1n are also connected through the external address bus AB1, the external data bus DB1, and the external control bus CB1 to the microcomputer Although each of the microcomputers 11-1n can access the DPRAM 5 of the microcomputer 20, only accessing by the microcomputer 11 is described in the following for simplicity of description.

In normal operation, the internal CPU 2 accesses the DPRAM 5. The memory map handled by the CPU 2 has been predetermined within the microcomputer 20, so that there is no need to perform address translation for the CPU 2 to access the DPRAM 5. Therefore, when the detecting circuit 27 detects the internal address signal on the internal address bus AB2 being within the predetermined address range, the enabling signal CE2 is generated. Therefore, the address decoder 22 and the sense amplifier 24 are enabled, and accessing of the DPRAM 5 by the CPU 2 is initiated. Specifically, the address decoder 22 decodes the internal address signal on the internal address bus AB2 and designates a memory cell in the memory array 28.

In contrast, when the external CPU 1 of the microcomputer 11 attempts to access the DPRAM 5 of the microcomputer 20, address translation as described in the following is needed. Specifically, since the address map handled by the external CPU 1 and the address map handled by the internal CPU 2 do not coincide with each other in general, it is not possible to provide a virtual address signal generated from the microcomputer 11 directly to the address decoder 21 of the microcomputer 20. This means that there is a necessity for translating a virtual address signal generated from the microcomputer 11 into a real address signal applicable to the address decoder 21 and the memory array 28. This address translation processing is performed by the offset register 3 and the address operation unit 4 provided in the microcomputer 20 in the manner as outlined in the following. Meanwhile, in the following description, the memory array 28 is assumed to have memory capacity of 128 bytes.

The difference between the address map handled by the CPU 1 and the address map handled by the CPU 2 can be known in advance. Accordingly, first, when a necessity for accessing the DPRAM 5 by the external CPU 1 arises, the difference between the addresses is given as offset data to the offset register 3 by the CPU 1 (or the CPU 2). In this embodiment, the more significant offset data of 12 bits F15-F4 are given through the data bus DB1 to the offset register 3 and held therein. The virtual address signal is given through the external address bus AB1 to the address operation unit 4 and to the address decoder 21. More specifically, the more significant 12 bit virtual address signals A15-A4 are given to the address operation unit 4, and the less significant 4-bit virtual address signals A3-A0 are given to the address decoder 21. The address operation unit 4 is responsive to the offset data F15-F4 held in the offset register 3 and the virtual address signals A15-A4 to generate the enabling signal CE1 for enabling the sense amplifier 23 and the address decoder 21 and the translated address signals of 3 bits A6'-A4' for designating a memory cell of the memory array 28. The sense amplifier 23 and the address decoder 21 are responsive to the signal CE1 to be enabled. The address decoder 21 is then responsive to the translated address signals A6'-A4' and the externally given less significant virtual address signals A3-A0 to designate a memory cell in the memory array 28.

Figure 2:
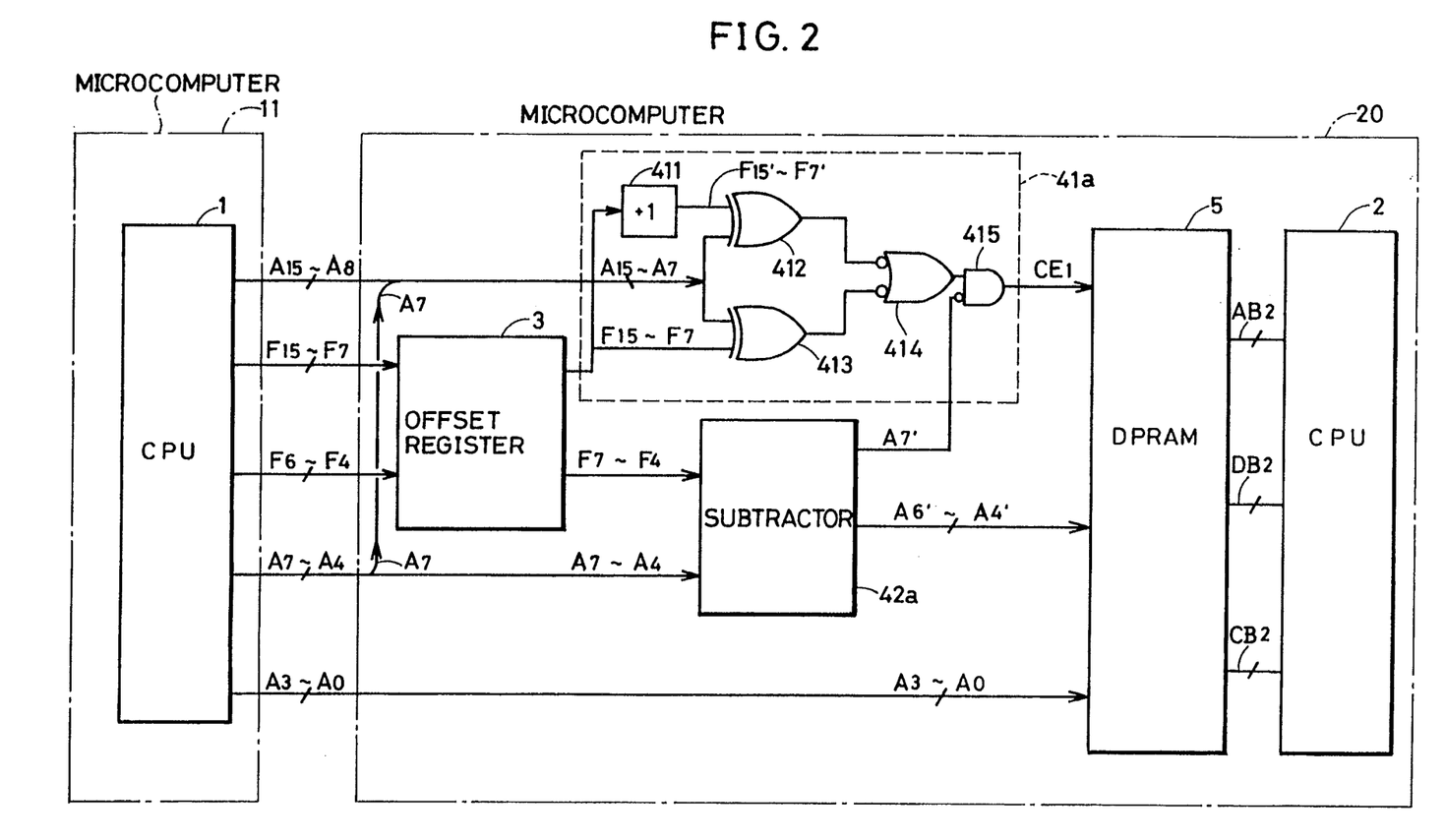
FIG. 2 is a circuit block diagram of the address translating circuit shown in FIG. 1.

The more details of the offset register 3 and the address operation unit 4 shown in FIG. 1 are shown in FIG. 2. Referring to FIG. 2, the microcomputer 20 includes an enabling signal generating circuit 41a and a subtractor 42a, which constitute the address operation unit 4 shown in FIG. 1, and an offset register 3. The offset register 3 is connected through a data bus (not shown) to receive the offset data of 12 bits F15-F4. The enabling signal generating circuit 41a is connected through an address bus (not shown) to receive the 9 bit virtual address signals A15-A7 generated by the microcomputer 11 and the 9 bit offset data F15-F7 held in the offset register 3. The subtractor 42a is connected to receive the 4 bit virtual address signals A7-A4 generated from the microcomputer 11 and the 4 bit offset data F7-F4 held in the offset register 3.

The enabling signal generating circuit 41a includes an adding circuit 411 which adds the data "+1" to the offset data F15-F7, a coincidence detecting circuit 412 which detects the coincidence between the added data and the virtual address signals A15-A7, and a coincidence detecting circuit 413 which detects the coincidence between the offset data F15-F7 and the virtual address signals A15-A7. A NAND gate 414 is connected to the output of the coincidence detecting circuits 412 and 413. Furthermore, an AND gate 415 is connected to the output of the NAND gate 414 and to the output of the subtractor 42a.

Figure 3:
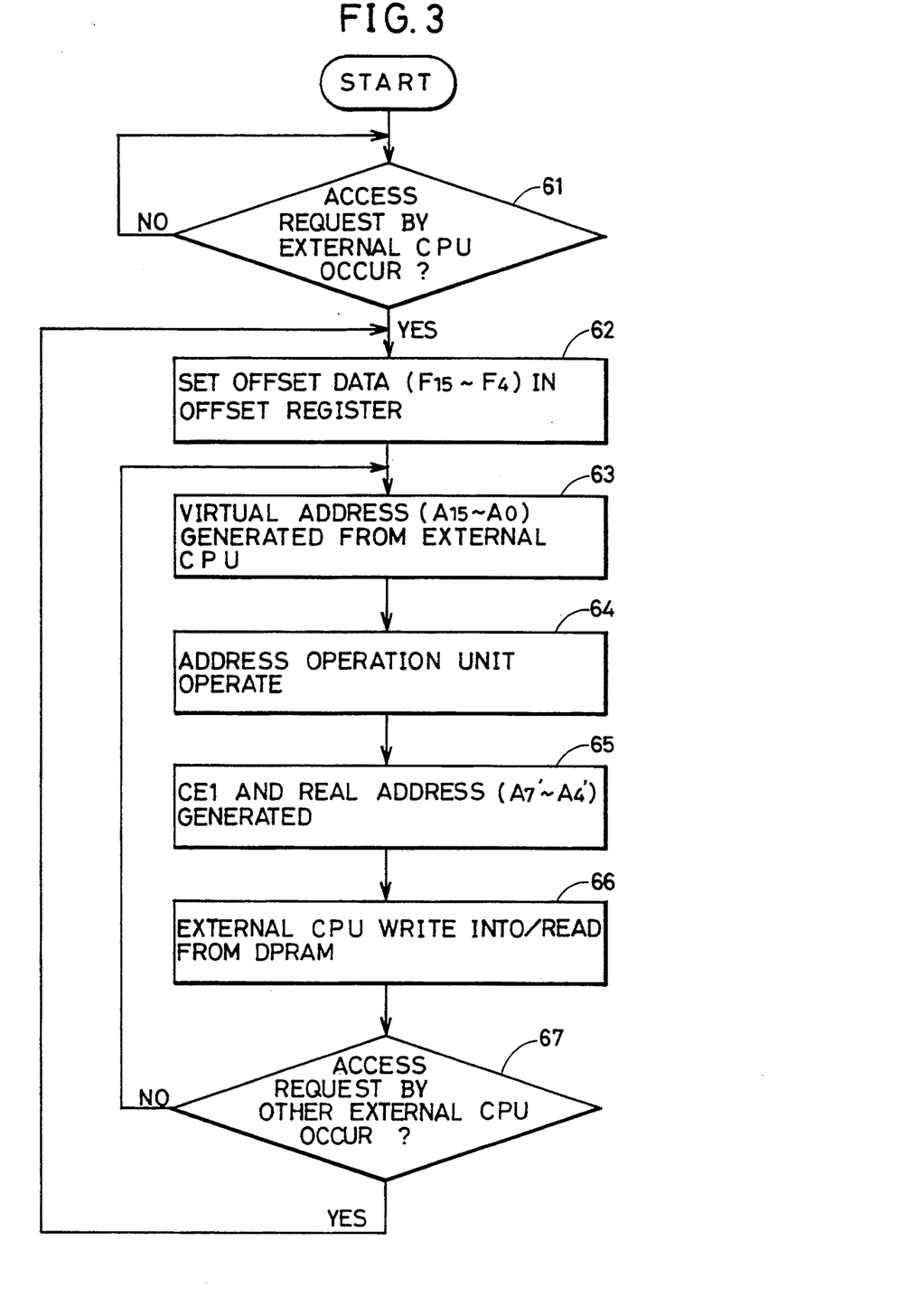
FIG. 3 is a flow chart for describing the circuit operation shown in FIG. 1 and FIG. 2.

Now, the operation will be described, referring to the flow chart shown in FIG. 3. First, in the step the occurrence of the access request by the external CPU 1 is detected. When the access request by the external CPU 1 arises, the offset data of 12 bits F15-F4 are set in the offset register 3. As described above, the offset data F15-F4 to be set is determined based upon the difference between the memory map handled by the external CPU 1 and the memory map handled by the internal CPU 2. The offset data F15-F7 held in the offset register 3 are given to the adding circuit 411 and the coincidence detecting circuit 413. In the adding circuit 411, the data "+1" is added to the offset data of 9 bits F15-F7, and the added data is given to the coincidence detecting circuit 412.

In step 63, the virtual address signals A15-A0 are generated from the CPU 1. The enabling signal generating circuit 41a receives the virtual address signals A15-A8, and the coincidence detecting operation is performed by the coincidence detecting circuits 412 and 413. As a result, when either of the coincidence detecting circuits 412 and 413 detects the coincidence of the given data; an enabling signal CE1 is generated from the AND gate 415. On the other hand, the subtractor 42a performs subtraction of the virtual address signals A7-A4 and the offset data F7-F4. The data A7' which shows the result of the subtraction is given to the AND gate 415, while the data A6'-A4' are given to the DPRAM 5 (step 65).

The DPRAM 5 is enabled in response to the enabling signal CE1, and the memory cell in the memory array is designated in response to the address signals A6'-A4' generated from the subtractor 42a and the less significant virtual address signals A3-A0. Therefore, in step 66, the memory cell in the DPRAM 5 is accessed (written/read) by the external CPU 1.

In step 67, whether an access request is generated from the other external CPU or not is determined. When this request is not generated, processing returns to step 63. Specifically, the external CPU 1 continues to access the DPRAM 5. On the other hand, when an access request is generated from the other external CPU, e.g. the CPU in the microcomputer 12 shown in FIG. 1, processing returns to step 62. More specifically, since the memory map handled in the microcomputer 12 and the memory map handled in the microcomputer 20 do not coincide with each other, the necessity for changing the offset data arises. Based upon the difference between these memory maps, new offset data is determined, and the determined offset data is set in the offset register 3 (step 62). After the offset data has been changed, processing of steps 63 etc. are performed, that is to say, the DPRAM 5 is accessed by the external CPU in the microcomputer 12.

Figure 4:
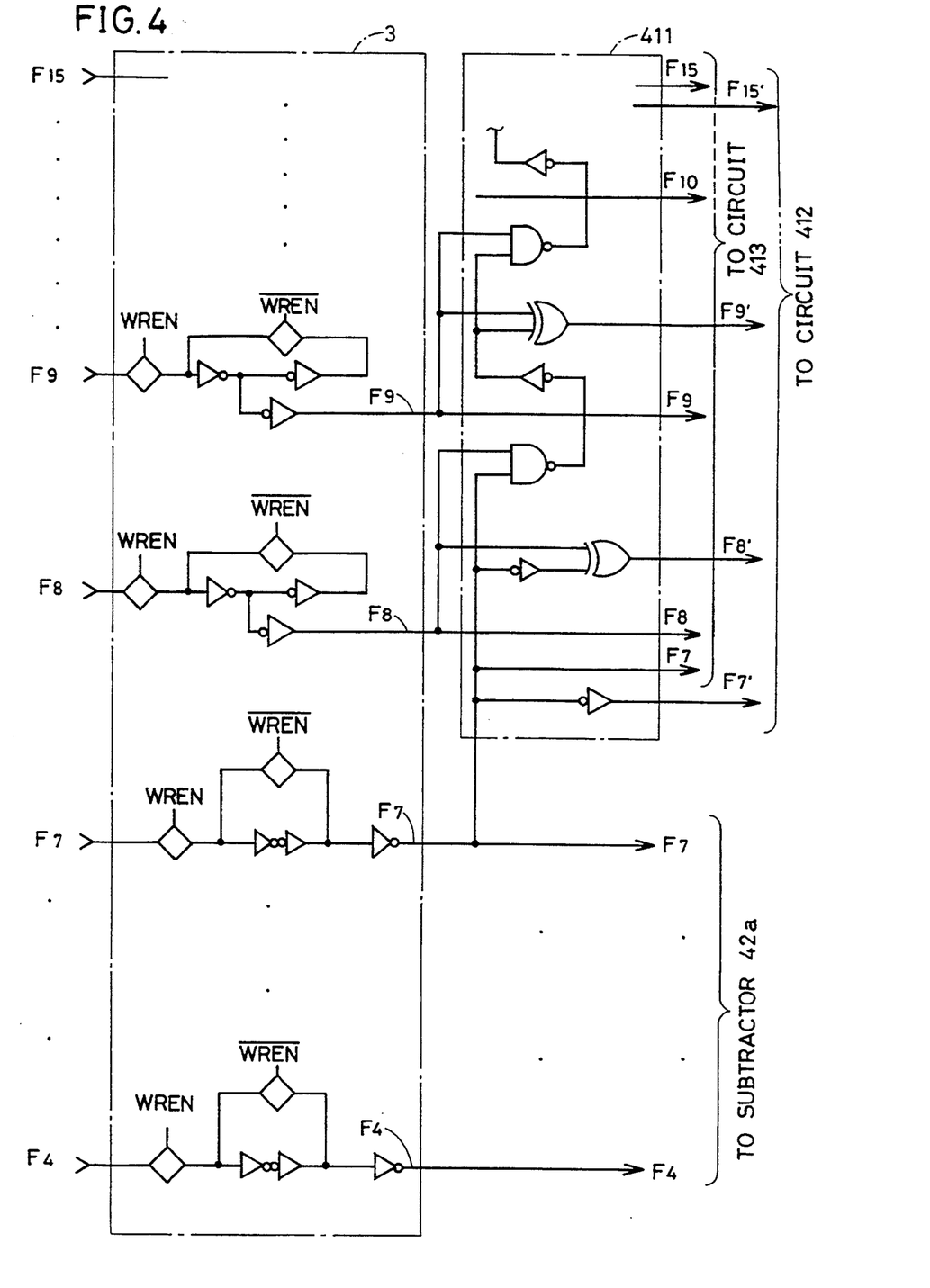
FIG. 4 is a circuit diagram of the offset register and the adding circuit shown in FIG. 2.

An example of the offset register 3 and the adding circuit 411 shown in FIG. 2 is shown in FIG. 4. Referring to FIG. 4, the offset register 3 is connected to receive the offset data F15-F4 given through data bus (not shown). The offset register 3 is responsive to the write enabling signals WREN given from the external control bus CB1 shown in FIG. 1 to hold each bit of the offset data F15-F4. The adding circuit 411 receives the offset data bits F15-F7 which are hold in the offset register 3, and adds the data "+1" to the data. The added data F15'-F7' are given to the coincidence detecting circuit 412. On the other hand, the non-added offset data F15-F7 are given to the coincidence detecting circuit 413. The offset data bits F7-F4 hold in the offset register 3 are given to the subtractor 42a.

Figure 5:
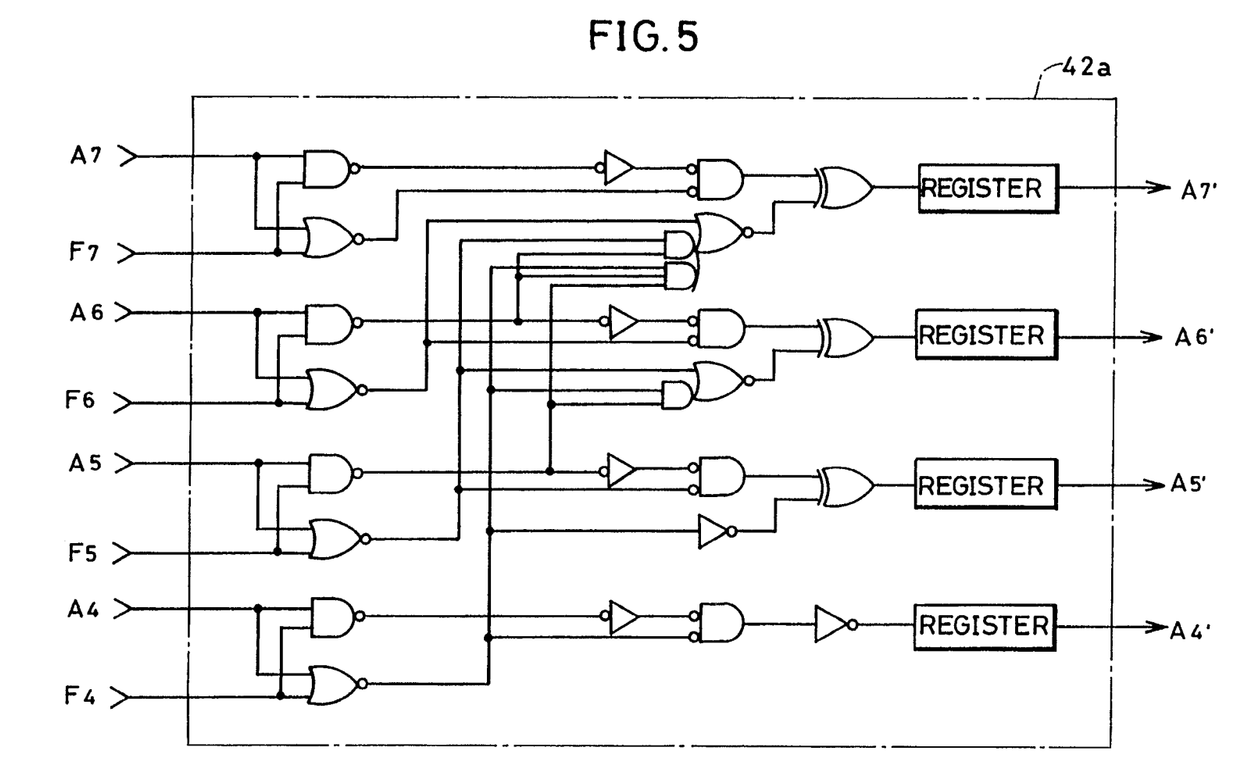
FIG. 5 is a circuit diagram of the subtractor shown in FIG. 2.

An example of the subtractor 42a shown in FIG. 2 is shown in FIG. 5. Referring to FIG. 5, the subtractor 42a receives the offset data bits held in the offset register 3 (not shown) and the virtual address signal bits A7-A4 and perform subtraction of these data. Since the subtractor 42a is implemented with a carry look-ahead type subtraction circuit of 4 bits, it can perform the operation of the more significant bits without waiting for the subtraction result of the less significant bits. Therefore, the occurrence of delay caused by propagation of a carry signal can be prevented. More specifically, the subtractor 42a can perform subtraction of two data at high speed. The data A6'-A4', which show the subtraction result, are given to the DPRAM as real address signals to designate memory cells of the DPRAM. The data A7' is given to the AND gate 415 shown in FIG. 2.

Figure 6A:
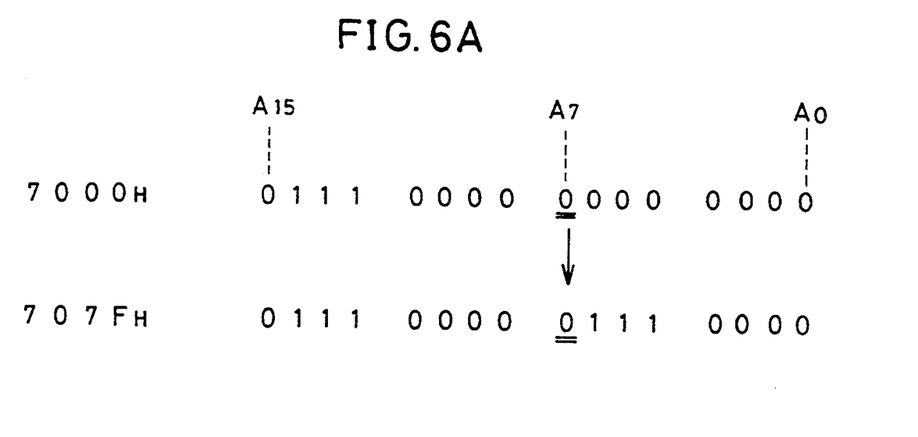
FIG. 6A-6C are address bit diagrams describing the necessity for the adding circuit shown in FIG. 2.
Figure 6B:
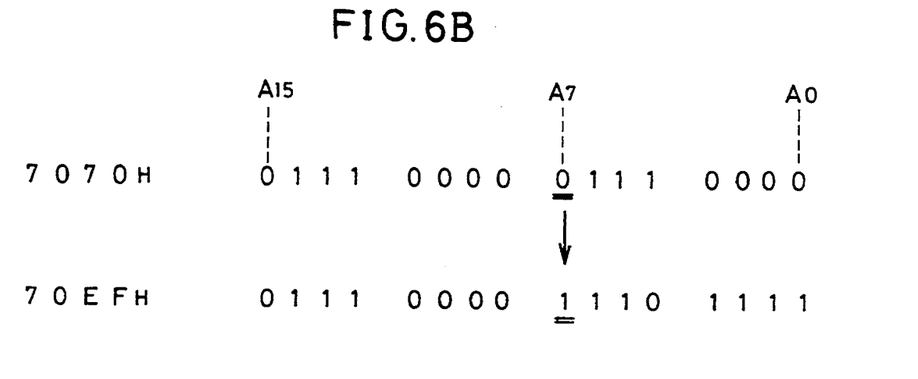
Figure 6C:
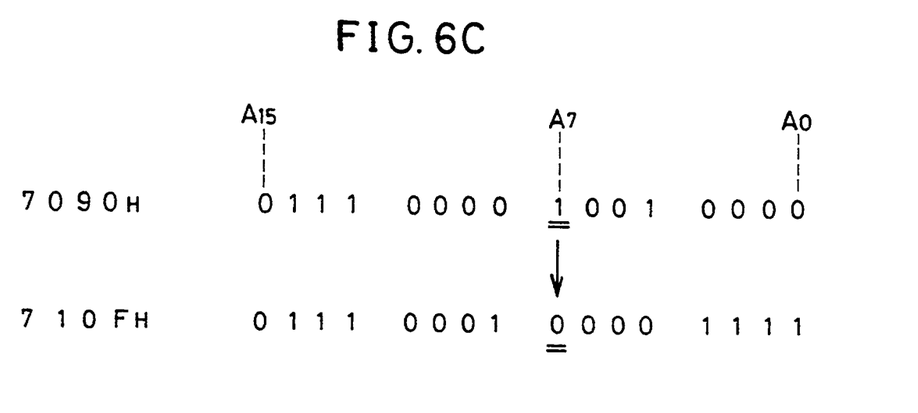

Referring to FIGS. 6A to 6C, the necessity of the adding circuit 411 shown in FIG. 2 will be described now. As described above, in the above embodiment, it is assumed that the memory array 28 in the DPRAM 5 has memory cells of 128 bytes. Therefore, the change of the virtual address bit A7 on the memory map handled by the CPU 1 differs in each of the cases where the address range of the DPRAM 5 is, for example, $7000_H-707F_H$ (FIG. 6A), $7070_H-70EF_H$ (FIG. 6B), and $7090_H-710F_H$ (FIG. 6C). Specifically, as shown in FIG. 6A, in the case where the virtual address signals change within the range of 7000$_H$-707F$_H$, the virtual address bit A7 does not change. As shown in FIG. 6B, however, in the case where the virtual address signals change within the range of 7070$_H$-70EF$_H$, the virtual address bit A7 changes from "0" to "1". Furthermore, as shown in FIG. 6C, in the case where the virtual address signals change within the range of 7090$_H$-710F$_H$, the virtual address bit A7 changes from "1" to "0", and the virtual address bit A8 changes from "0" to "1". Therefore, in any cases shown in FIG. 6B and FIG. 6C, it is necessary to add the data "+1" to the virtual address signal A7. Therefore, the adding circuit 411 shown in FIG. 2 is provided in the enabling signal generating circuit 41a, and the data "+1" is added to the offset data F15-F7.

Figure 7:
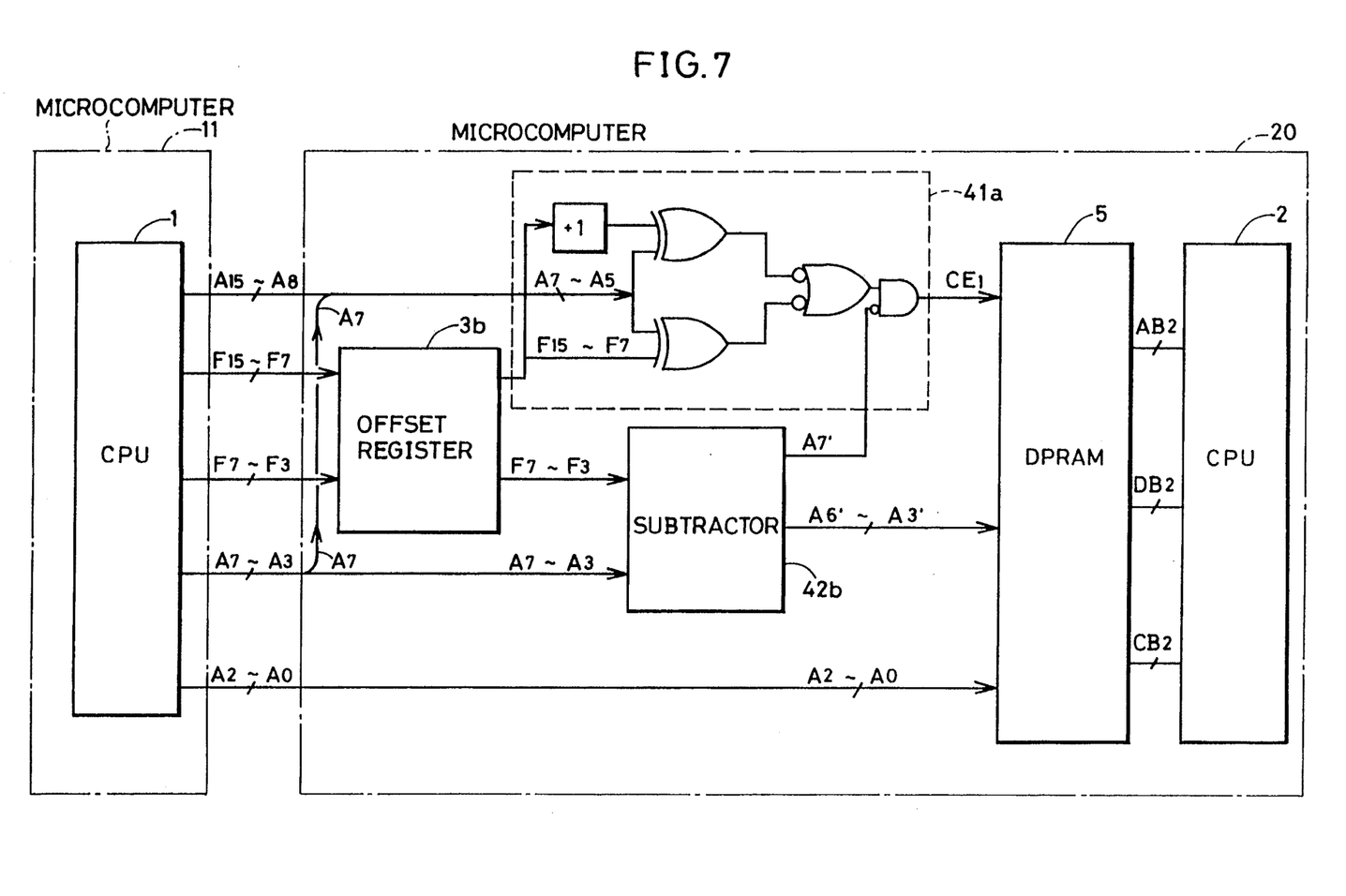
FIG. 7 is a circuit block diagram of the address translating circuit illustrating still another embodiment of the invention.

Referring to the circuit shown in FIG. 2, the virtual signals A7-A4 are given to the subtracting circuit 42a, so that the memory array 28 with memory capacity of 128 bytes is accessed for every 16 bytes. By contrast, as shown in FIG. 7, it is possible to make the memory array 28 be accessed for every 8 bytes by giving the virtual address signals A7-A3 and the offset data F7-F3 to the subtractor 42b. Specifically, since the subtractor 42b performs subtraction of these two data, the data of 4 bits A6'-A3' are generated as the more significant bits for designating memory cells. As a result, the DPRAM 5 can be accessed in more detailed units.

Figure 8:
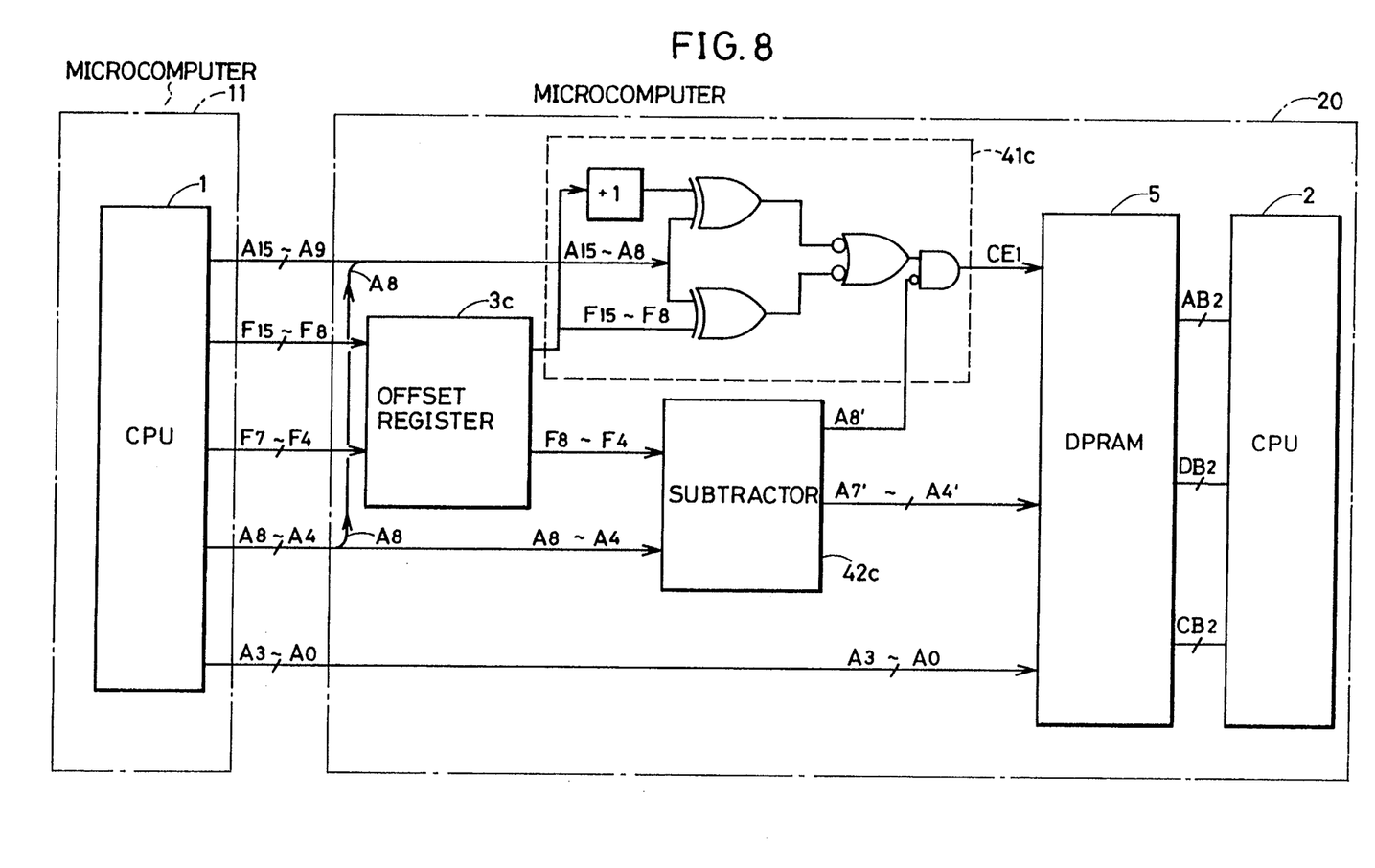
FIG. 8 is a circuit block diagram of the address translating circuit illustrating another embodiment of the invention.

Furthermore, in the case where the memory capacity of the DPRAM is 256 bytes, the handling of the virtual address bit A8 needs to be changed, as shown in FIG. 8 More specifically, the enable signal generating circuit 41c receives the virtual address signals A15-A8 and the offset data F15-F8 and perform the same operation as that of the circuit shown in FIG. 2. The subtractor 42c receives the virtual address signals A8-A4 and the offset data F8-F4 and performs the same operation as that of the circuit in FIG. 2. As a result, it can be understood that even if the memory capacity of the DPRAM 5 is increased, it is easy to cope with that by slight circuitry change.

As described above, since the offset register 3, the enabling signal generating circuit 41a and the subtractor 42a, which are shown in FIG. 2, are provided in the microcomputer 20 having the DPRAM 5 which needs to be externally accessed, the burden of the external CPU 1 is prevented from increasing due to the address translation. More specifically, since the address translation processing is executed by the circuit operation in these circuits 3, 41a, and 42a, there is no need for the external CPU 1 to perform address translation processing by operation. In addition, the address translation which is necessary for the other external CPU to access can also be readily done by these circuits 3, 41a, and 42a by changing the offset data set in the offset register Furthermore, in the case to which the circuit shown in FIG. 7 is applied, the memory array 28 in the DPRAM 5 can be accessed in more detailed address units. In the case where the memory capacity of the DPRAM 5 is increased, it is also possible to cope with that by slight circuitry change as shown in FIG. 8.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An address translating apparatus for translating an externally applied virtual address signal into a real address signal for addressing a memory cell array, comprising:
   a) offset data holding means for holding predetermined offset data for address translation;
   b) enabling means responsive to predetermined more significant bits of the virtual address signal and predetermined more significant bits of the offset data held in said offset data holding means for enabling access to said memory cell array, said enabling means having
      i) first coincidence detecting means for detecting coincidence of the more significant bits of the virtual address signal and the offset data held in said offset data holding means,
      ii) second coincidence detecting means for detecting coincidence between the more significant bits of the virtual address signal and data bits having a prescribed relationship with the more significant bits of the virtual address signal; and
   c) real address signal generating means responsive to predetermined less significant bits of the virtual address signal and predetermined less significant bits of the offset data held in said offset data holding means for generating said real address signal.

2. An address translating apparatus according to claim 1, wherein said enabling means and real address signal generating means share a common address bus, and
   said memory cell array is responsive to said first coincidence detecting means to be enabled.

3. An address translating apparatus according to claim 1, wherein
   said real address signal generating means includes difference detecting means for detecting a difference between the less significant bits of the virtual address signal and the less significant bits of the offset data held in said offset data holding means; and
   said difference detecting means providing a detected difference signal as said real address signal.

4. An address translating apparatus according to claim 2, wherein said enabling means further comprises:
   adjacent data generating means, responsive to the more significant bits of the virtual address signal, to generate said data bits, the data bits being an address adjacent to the data defined by the more significant bits of the virtual address signal; and
   said memory cell array is responsive to said second coincidence detecting means to be enabled.

5. An address translating apparatus according to claim 4, wherein said adjacent data generating means comprises:
   adding means for receiving the more significant bits of the virtual address signal and adding "+1" to the data defined by the more significant bits of the virtual address signal.

6. An address translating apparatus according to claim 3, wherein said difference detecting means comprises:
   a subtractor connected to receive the less significant bits of the virtual address signal and the less significant bits of the offset data held in said offset data holding means; and
   said subtractor providing the subtraction result as said real address signal.

7. An address translating apparatus according to claim 6, wherein said subtractor comprises a carry look-ahead type subtractor.

8. An address translating apparatus according to claim 1, wherein
said memory cell array comprises a random access memory cell array having dual ports.

9. A data processing apparatus comprising:
a memory cell array including a plurality of memory cells arranged in rows and columns; and
address translating means for translating an externally applied virtual address signal into a real address signal for addressing said memory cell array, wherein said address translating means comprises
offset data holding means for holding predetermined offset data for address translation,
enabling means responsive to predetermined more significant bits of the virtual address signal and predetermined more significant bits of the offset data held in said offset data holding means for enabling access to said memory cell array, said enabling means having
  i) first coincidence detecting means for detecting coincidence of the more significant bits of the virtual address signal and the offset data held in said offset data holding means,
  ii) second coincidence detecting means for detecting coincidence between the more significant bits of the virtual address signal and data bits having a prescribed relationship with the more significant bits of the virtual address signal by addition of a prescribed value to the more significant bits of the virtual address, and
real address signal generating means responsive to predetermined less significant bits of the virtual address signal and predetermined less significant bits of the offset data held in said offset data holding means for generating said real address signal, wherein said enabling means and real address signal generating means share a common address bus.

10. A data processing apparatus comprising:
a memory cell array having first and second input/output ports and a plurality of memory cells arranged in rows and columns;
first accessing means connected to the first input/output port of said memory cell array for accessing said memory cell array through the first input/output port; and
second access means connected to the second input/output port of said memory cell array and responsive to an externally applied virtual address signal for accessing said memory cell array through the second input/output port, wherein said second access mean comprises
offset data holding means for holding predetermined offset data for address translation,
enabling means responsive to predetermined more significant bits of the virtual address signal and predetermined more significant bits of the offset data held in said offset data holding means for enabling access to said memory cell arrays, said enabling means having
  i) first coincidence detecting means for detecting coincidence of the more significant bits of the virtual address signal and the offset data held in said offset data holding means,
  ii) second coincidence detecting means for detecting coincidence between the more significant bits of the virtual address signal and data bits having a prescribed relationship with the more significant bits of the virtual address signal by addition of a prescribed value to the more significant bits of the virtual address, and
real address signal generating means responsive to predetermined less significant bits of the virtual address signal and predetermined less significant bits of the offset data held in said offset data holding means for generating said real address signal, said enabling means and real address signal generating means sharing a common address bus and said memory cell array being responsive to the real address signal generated from said real address signal generating means to be addressed.

11. A data processing apparatus according to claim 10, wherein said first accessing means comprises:
means for generating an access request signal requesting access to said memory cell array;
designating means connected to said memory cell array and responsive to the access request signal for designating the memory cells in said memory cell array; and
reading means connected to said memory cell array and responsive to the access request signal for reading the data stored in the memory cell which is designated by said designating means.

12. A data processing apparatus according to claim 11, wherein said access request signal generating means comprises a central processing unit for generating the access request signal.

* * * * *